United States Patent Office 2,861,917
Patented Nov. 25, 1958

2,861,917

METHOD OF TREATING ENDOPARASITIC WORMS BY APPLYING A HETEROCYCLIC QUATERNARY HALIDE

Milton Kosmin, Dayton, Ohio, assignor to Monsanto Chemical Company, St. Louis, Mo., a corporation of Delaware No Drawing. Application August 18, 1955
Serial No. 529,313

7 Claims. (Cl. 167—33)

This invention relates to the control of endoparasitic and ectoparasitic worms which exist in the soil at some stage of their life cycles, for example, eggs, larvae and adult worms. The invention is particularly directed to methods of inhibiting and eradicating nematodes or eelworms, e. g., such as the rootnode nematode, which attack subterranean plant development.

The control of nematodes and other parasitic worms in soil is a complex problem. These organisms, either in the egg, larvae or adult stage, are protected by a difficultly permeable membrane. Hence the effective toxicant must have both the property of penetrating the resistant coatings and the ability to kill. It must also be readily dispersible in soils or other environment of the organism and be stable when incorporated therein. Since the object of ridding soils of nematodes and parasites is to provide a beneficial growth media for plants, the nematocide or parasiticide must not be phytotoxic to plants, or, if phytotoxic, this effect must not be long-lived. Such a nematocide, either itself or some phytotoxic decomposition product thereof, should be such that, previous to planting, it is removed from the soil by evaporation, by rain washing or by soil bacterial decomposition.

For the reasons set forth above, completely effective agents for nematodes and other parasitic worm life are not generally available. Furthermore, one skilled in the art cannot predict the effectiveness of compounds as practicable toxicants, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above-described requisite properties. A further purpose of this invention is to provide a useful method of freeing soils from objectionable nematode life. Other purposes of this invention will be evident from the following specification.

It has now been found that certain quaternary nitrogen compounds are very effective as nematocides and as agents for controlling other parasitic worms. The presently useful compounds are heterocyclic quaternary halides of the formula

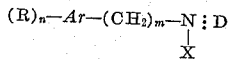

in which R is selected from the class consisting of alkyl and chloroalkyl radicals of from 1 to 20 carbon atoms, $n$ is an integer of from 0 to 3 and the total number of carbon atoms in the total R radicals is less than 30, $Ar$ is an aromatic hydrocarbon radical of from 6 to 12 carbon atoms, $m$ is an integer of from 1 to 3, X is halogen and N:D represents a compound of the pyridine series consisting of pyridine, quinoline, isoquinoline, and C-linked alkyl homologs thereof containing from 1 to 3 C-alkyl substituents, the number of carbon atoms in each of said C-alkyl substituents being from 1 to 2.

The above general formula includes the benzyl and mono-, di- or trialkyl benzyl pyridinium, quinolinium, isoquinolinium, lepidinium, picolinium and lutidinium halides having from 1 to 18 carbon atoms in the alkyl radical and less than a total of 30 carbon atoms in the total number of alkyl radicals attached to the benzyl nucleus, e. g., 1-(4-isopropylbenzyl)pyridinium chloride, 1-(2,4,6-triethylbenzyl)pyridinium chloride, 1-[4-(3,5,5-trimethylhexyl)benzyl]-2-methyl-5-ethylpyridinium chloride, 1-(3,5,5-trimethylbenzyl)-2-picolinium bromide, 1-(ar-dodecyl-ar-methyl)benzylpyridinium chloride, 1-(ar-octadecylbenzyl)lepidinium chloride, 1-(3-isobutylbenzyl)-s-collidinium chloride, 1-(4-sec-amylbenzyl)quinolinium chloride, 1-benzylpyridinium chloride, 1-benzylisoquinolinium iodide, 1-(4-ethylbenzyl)pyridinium bromide, 1-(ar-hendecylbenzyl)pyridinium chloride, 1-(ar-eicosylbenzyl)quinolinium chloride, 1-(2,4-dimethylbenzyl)pyridinium chloride, benzyl-2,4-lutidinium chloride, 1-(ar-dibutyl-ar-decyl)pyridinium bromide, 1-(ar-didodecylbenzyl)pyridinium chloride, 1-(ar-dodecyl-ar-octyl)-pyridinium chloride, etc.

The above general formula also included naphthylmethyl or diphenylylmethyl quaternary halides and derivatives thereof having 1, 2, or 3 alkyl radicals attached to the aromatic nucleus, e. g., 1-(α-naphthyl)methylpyridinium or quinolinium chloride, 1-(4-biphenylyl)methylpyridinium or picolinium chloride or bromide, 1-[α-(β-dodecylnaphthyl)]methylpyridinium or lepidinium chloride or iodide, 1-[4-(ar-diisopropylbiphenylyl)]methylpyridinium chloride.

Also useful as nematocides and having the above general formula are the ar-chloroalkyl derivatives of the benzyl, naphthylmethyl, or biphenylylmethyl heterocyclic quaternary halides of the pyridine series, e. g., 1-[4-(2-chloroethyl)benzyl]pyridinium or isoquinolium chloride or iodide, 1-(2-dodecyl-4-chloromethylbenzyl)pyridinium or lepidinium chloride or bromide, 1-[ar-(3-chloropropyl)-ar-octadecylbenzyl]pyridinium or 4-picolinium chloride, 1-[2,3-bis(2-chloroethyl)-4-n-amylbenzyl]pyridinium chloride, 1-[4-(chlorohexadecyl)benzyl]quinolinium chloride, 1-[α-(β-chloromethylnaphthyl)methyl]pyridinium chloride, 1-[4-(2-chloromethyl-3-dodecylbiphenylyl)-methyl]pyridinium chloride, etc.

Also useful for the present purpose and having the above general formula are arylethyl or arylpropyl heterocyclic quaternary halides of the pyridinium series, e. g., 1-(2-phenylethyl)pyridinium chloride or iodide, 1-[3-(4-n-dodecylphenyl)propyl]-3-picolinium chloride or bromide, 1-[2-{ar-(chloromethyl)-ar-(2-ethylhexyl)phenyl}-ethyl]pyridinium chloride or bromide, 1-[2-(α-naphthyl)-ethyl]pyridinium chloride or bromide, 1-[2-(4-biphenylyl)ethyl]pyridinium chloride or iodide, 1-[3-(ar-decyl-ar-ethylphenyl)propyl]pyridinium chloride, etc.

As herein employed, the prefix ar throughout the specification and claims denotes substitution of the radical which it prefixes at an uncertain position of the aromatic nucleus. Thus, the presently useful alkylbenzyl pyridinium halides have the general formula

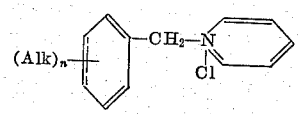

in which the alkyl radical has from 1 to 20 carbon atoms and in which the total number of carbon atoms in the total alkyl radicals is less than 30, and $n$ is a number of from 1 to 3.

The invention is further illustrated, but not limited, by the following example:

EXAMPLE

This example describes evaluation of a number of benzylpyridinium chlorides as nematocides, employing an aqueous nematode culture. It is known that a nematode, when placed in water, flexes its body at a more or less constant rate and that the effect of a nematocide can be estimated with reasonable accuracy by counting the rate of these flexures.

The chlorides were respectively dissolved in a small quantity of acetone and the resulting solutions and an emulsifying agent (a sorbitan monolaurate polyoxyethylene derivative known to the trade as "Tween 20") were respectively added to water to make up a 2 percent concentration of each chloride. The emulsifier was present in a concentration of less than about 1.0 percent. The resulting emulsions were then diluted with water to give a 0.2 percent concentration of the chloride.

Live nematodes (*Panagrellus redivivis*) were placed in a vessel of water, and 2.5 mls. of the 0.2 percent emulsion of the chloride was added to the vessel. This corresponded to a 0.1 percent concentration of the chloride in the vessel of nematodes. One vessel was held as control.

Starting a timer as the emulsion of chloride was added to the nematode suspension, the organisms were examined by means of a stereoscopic microscope and the motility estimated and recorded at timed intervals. The following table sets forth the motility of the nematodes as compared to the control culture:

Table I

| -benzyl)pyridinium chloride tested at 0.1% concentration | Percent Motility after— | | | |
|---|---|---|---|---|
| | 10 min. | 1 hr. | 2 hrs. | 24 hrs. |
| 1-(4-sec-Butyl- | 25 | 0 | 0 | 0 |
| 1-(ar-Dodecyl-ar-methyl- | 50 | 1 | 1 | 0 |
| 1-(ar-Dodecyl- | 5 | 0 | 0 | 0 |
| 1-(ar-Chloromethyl-ar-dodecyl- | 50 | 2 | 1 | 0 |
| 1-(ar-Hexyl- | 90 | 25 | 25 | 0 |
| 1-(ar-Octadecyl- | 25 | 5 | 1 | 0 |
| Control (no test chemical) | 100 | 100 | 100 | 100 |

When tested at a concentration of 0.01%, the following gave 0.0% motility at 24 hours:

1-(ar-dodecyl-ar-methyl)benzylpyridinium chloride
1-(ar-dodecylbenzyl)pyridinium chloride
1-(ar-chloromethyl - ar - dodecyl)benzylpyridinium chloride
1-(ar-octadecylbenzyl)pyridinium chloride Nematocidal compositions comprising the present heterocyclic quaternary halides are effective in eliminating or controlling nematode activity when applied to the soil at the rate of 50 to 600 lbs. per acre. Preferred level of application useful in soils of average infestation will be from 50 to 200 lbs. per acre.

Obviously, heavily infested areas may require the use of higher proportions and lightly infested areas may be treated effectively with smaller proportions. The compositions being water-dispersible may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adapted for use in the practice of this invention.

In addition to the use in soils, the invention may be practiced in any other nematode environment, for example, greenhouse potting mixtures and other soil substitutes. Nematode environments may include rooted plants, tubers, seeds and bulbs, in which case the toxicant is used as a rinse to remove and destroy eggs, larvae and adult nematodes which may be present.

The present quaternary nitrogen compounds are useful in destroying endoparasitic worms other than nematodes which frequently infect barnyards or other areas frequented by domestic animals and fowl. The treatment of the surface soils in such localities will minimize infections by flukes, tapeworms and other helminth parasites in the animals and fowl by destruction of eggs and larvae of the parasites during the soil phase of their life cycles.

What is claimed is:

1. The method of controlling endoparasitic worms which comprises applying to soils, plants and seeds susceptible to infestation by the worms a composition comprising a heterocyclic quaternary halide of the formula

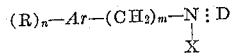

in which R is selected from the class consisting of alkyl and chloroalkyl radicals of from 1 to 20 carbon atoms, $n$ is an integer of from 0 to 3, and the total number of carbon atoms in the total R radicals is less than 30, Ar is an aromatic hydrocarbon radical of from 6 to 12 carbon atoms, $m$ is an integer of from 1 to 3, X is selected from the class consisting of chlorine, bromine and iodine and N:D represents a compound of the pyridine series consisting of pyridine, quinoline, isoquinoline and C-linked alkyl homologs thereof containing from 1 to 3 C-alkyl substituents, the number of carbon atoms in each of said C-alkyl substituents being from 1 to 2.

2. The method of treating nematode-infested soil which comprises dispersing in the soil a toxic quantity of a pyridinium chloride of the formula

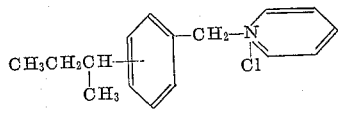

3. The method of treating nematode-infested soil which comprises dispersing in the soil a toxic quantity of a pyridinium chloride of the formula

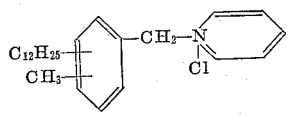

in which $C_{12}H_{25}$ denotes the dodecyl radical.

4. The method of treating nematode-infested soil which comprises dispersing in the soil a toxic quantity of a pyridinium chloride of the formula

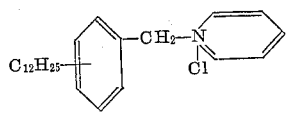

in which $C_{12}H_{25}$ denotes the dodecyl radical.

5. The method of treating nematode-infested soil which comprises dispersing in the soil a toxic quantity of a pyridinium chloride of the formula

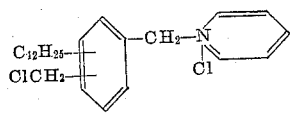

in which $C_{12}H_{25}$ denotes the dodecyl radical.

6. The method of treating nematode-infested soil which comprises dispersing in the soil a toxic quantity of a pyridinium chloride of the formula

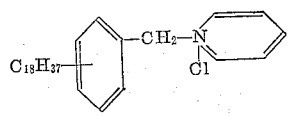

in which $C_{18}H_{37}$ denotes the octadecyl radical.

7. The method of controlling nematodes which comprises applying to soils, plants and seeds susceptible to infestation by the nematodes a composition comprising a pyridinium chloride of the formula
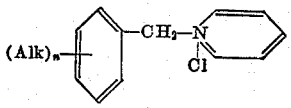
in which the alkyl radical has from 1 to 20 carbon atoms and in which the total number of carbon atoms in the total alkyl radicals is less than 30, and $n$ is a number of from 1 to 3.
References Cited in the file of this patent
UNITED STATES PATENTS
2,335,323 Tisdale _____ Nov. 30, 1943
2,678,316 Harris _____ May 11, 1954